W. Peters,
Coating Journal Bearings.
N° 35,976. Patented July 22, 1862.
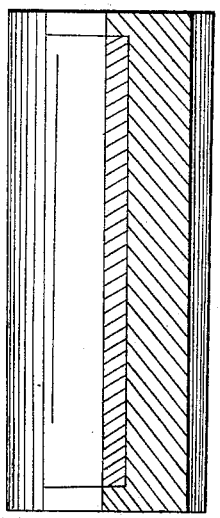
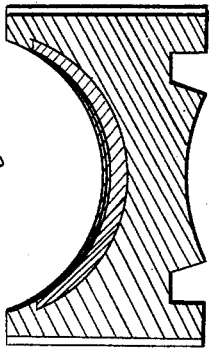
Witnesses
Geo C Lembright
J. Smith
Inventor
Wm Peters
by Atty Thos T Everett

UNITED STATES PATENT OFFICE.

WILLIAM PETERS, OF BALTIMORE, MARYLAND, ASSIGNOR TO HIMSELF AND ALFRED BUCK, OF SAME PLACE.

IMPROVEMENT IN COATING THE BEARINGS OF BOXES FOR AXLES, SHAFTS, &c.

Specification forming part of Letters Patent No. 35,976, dated July 22, 1862.

*To all whom it may concern:*

Be it known that I, WILLIAM PETERS, of the city of Baltimore, in the State of Maryland, have invented a certain new and useful Improvement in Lining or Coating the Bearings of Boxes for Axles, Shafts, &c.; and I do hereby declare that the following is a full, clear, and exact description thereof, reference being had to the accompanying drawings, and to the letters and marks thereon.

Of the drawings forming part of this specification, Figure 1 is a view by transverse section of a part of a journal-box; and Fig. 2, a view by longitudinal section of the same.

The lining of the bearing in both of these figures is indicated by the blue coloring. As is shown by these figures, the lining is fitted into a depression or recess of the box, so that the sides of such recess aid in keeping the lining in place. This lining consists of one or more layers or strata of plates or slabs made out of a composition of asbestus and some vegetable or animal fiber or substance, and in some cases may be made out of the asbestus and plumbago, or some mineral substance. In making the slabs or plates or blocks of the articles here named, I generally adopt this plan, although other plans may be used. I place in a tub or vat alternate layers of asbestus and some animal or vegetable fiber, and pass through them a current of steam or water, or some other fluid, and when the mass is in suitable condition for pressure I subject it to hydraulic or other pressure, so that I form plates or slabs of such thickness as I desire; or I can place it in molds and compress it into any form or shape I wish for. In some instances, and with some substances, it will not be necessary to expose the material to moisture or fluid, pressure alone being only necessary to give the mass the shape or form preferred. The figures of the drawings show several layers of the sheets or plates made up of the materials here named. These plates may be all of one thickness, or of different degrees of thickness. If the recess of the box be mostly of plates of moderate thickness, with the upper layer somewhat thicker, this upper layer will be the more perfectly kept in the recess, though a portion of it may be above the line of the recess.

This lining of the bearings of boxes has elasticity, is non-conducting and non-combustible. The upper layer of it can be coated with oil or any lubricating material without much of such material being lost upon or within the lower layer; hence less lubricating material will be required than with any other lining of the bearing. The material itself is anti-friction, and this, with its other qualities, makes a lining of great value and very economical. The axle or journal will run smooth, will not be heated up, and will have an elastic instead of a hard bearing.

What I claim as an improvement in lining the bearings of boxes for axles, shafts, &c, is—

Lining them with the plates, slabs, or blocks made of the material herein set forth.

This specification signed this 26th day of April, 1862.

WM. PETERS.

Witnesses:
 THOS. T. EVERETT,
 J. W. MOHLER.